(12) United States Patent
Dziekonski et al.

(10) Patent No.: US 11,125,361 B2
(45) Date of Patent: Sep. 21, 2021

(54) THREAD FORM AND THREADED ARTICLE

(71) Applicants: Mitchell Z. Dziekonski, Stafford, TX (US); Andyle Gregory Bailey, Kingwood, TX (US)

(72) Inventors: Mitchell Z. Dziekonski, Stafford, TX (US); Andyle Gregory Bailey, Kingwood, TX (US)

(73) Assignee: Mitchell Z. Dziekonski, Stafford, TX (US)

( * ) Notice: Subject to any disclaimer, the term of this patent is extended or adjusted under 35 U.S.C. 154(b) by 282 days.

(21) Appl. No.: 16/286,266

(22) Filed: Feb. 26, 2019

(65) Prior Publication Data

US 2019/0271418 A1 Sep. 5, 2019

Related U.S. Application Data

(60) Provisional application No. 62/637,110, filed on Mar. 1, 2018.

(51) Int. Cl.
*F16L 15/06* (2006.01)
*E21B 17/042* (2006.01)

(52) U.S. Cl.
CPC ............ *F16L 15/06* (2013.01); *E21B 17/042* (2013.01)

(58) Field of Classification Search
CPC ....... F16L 15/06; F16L 15/001; F16L 15/006; F16L 15/00; E21B 17/042
USPC ......................................... 285/390, 333, 334
See application file for complete search history.

(56) References Cited

U.S. PATENT DOCUMENTS

| | | |
|---|---|---|
| 5,505,502 A | 4/1996 | Smith et al. |
| 6,447,025 B1 | 9/2002 | Smith |
| 7,210,710 B2 * | 5/2007 | Williamson .......... E21B 17/042 |
| | | 285/333 |
| 2005/0189147 A1 | 9/2005 | Williamson et al. |
| 2006/0214421 A1 | 9/2006 | Muradov |
| 2014/0182426 A1 | 7/2014 | Mazzaferro et al. |
| 2015/0035273 A1 | 2/2015 | Moore |
| 2015/0362100 A1 | 12/2015 | Li et al. |

FOREIGN PATENT DOCUMENTS

EP 3141689 A1 3/2017

OTHER PUBLICATIONS

International Search Report and Written Opinion for PCT/US2019/019792 dated Jun. 6, 2019, 14 pages.

* cited by examiner

*Primary Examiner* — Aaron M Dunwoody
(74) *Attorney, Agent, or Firm* — Fletcher Yoder, P.C.

(57) ABSTRACT

A threaded product is provided having an external thread form on a tubular pin member comprises load and stab flanks on either side of a crest, along with smooth transitions between the crest and flanks. An elliptical root between the flanks aids in reducing stress and forms a dope volume between a non-conforming crest of an internal thread form of a tubular box member. Flanks of the internal thread of the box member contact flanks of the external thread of the pin member to form areas of mating contact on either side of the thread.

20 Claims, 6 Drawing Sheets

THREAD FORM AND THREADED ARTICLE

CROSS-REFERENCE TO RELATED APPLICATIONS

This application claims priority from and the benefit of U.S. Provisional Application Ser. No. 62/637,110, entitled "Thread Form and Threaded Article," filed Mar. 1, 2018, which is hereby incorporated by reference in its entirety.

BACKGROUND

The invention relates to threaded articles, and particularly to a novel thread form adapted for applications requiring significant resistance to torsional, axial, and thrust loading.

A myriad of threads and thread forms have been developed, many for specific purposes. Threads typically include features that enable them to seal with mating thread, where desired, but also to be engaged or "made up" in desired ways that accommodate the target application. A particular class of applications includes threaded connections for long strings of tubulars, such as those used in wells, and particularly in oil and gas prospecting, drilling, completion, and production. Well applications present a number of unique problems that must be addressed for successful deployment of drilling and downhole tools. Such applications may entail drilling, drilling assemblies, well casing, completion assemblies, production, offshore risers, offshore well devices, and a range of different materials and material alloys.

In general, well applications call for a number of tubular sections, typically of a standard length, to be joined end-to-end by a threaded connection that serves to support the string, and in come applications to transmit torsional forces to drive the string in rotation, and that may create seal between an inner volume and the surrounding environment. Moreover, the string may include different materials that need to be joined to one another while avoiding failure of both the tubulars themselves and the threaded connections. The demands of well environments include the need for threads to be made up relatively quickly, and with minimum risk of damage to the threaded connections at the ends of tubulars, such as drill and production pipe. In addition, the threaded connections must resist significant torsional loading encountered as a tubular string is built at a rig and deployed into the well, many times at great lengths that may cause distortion and twisting of the string. Moreover, very significant axial and thrust loads, as well as very high tensile loads are encountered as the tubular string are forced into a well.

Thread forms for well tubulars include very specialized profiles designed with such demands in mind. While many of these function well, there remains a need for improved thread forms and threaded products incorporating such forms, particularly for applications requiring joining of tubulars for deviations in wells and for short radius programs. There is a particular need for threaded tubulars that may be employed in different demanding environments in well applications, both onshore and offshore, and that can better withstand axial, tensile, torsional, bending, and other loading, as well as vibration.

BRIEF DESCRIPTION

The present disclosure sets forth a novel thread form and threaded products designed to respond to such needs. In accordance with one aspect, tubular product comprises a tubular pin member comprising an external thread form at a pin end thereof, the external thread form comprising an external load flank, an external crest, an external stab flank, an external root, a first external radiused transition between the external load flank and the external crest, and a second external radiused transition between the external crest and the external stab flank. The external root may have an elliptical profile tangentially joining the external load and external stab flanks. A tubular box member coaxially threadingly engages the tubular pin member and comprises an internal thread form at a box end thereof, the internal thread form comprising an internal load flank, an internal crest, an internal stab flank, an internal root, a first internal radiused transition between the internal load flank and the internal crest, and a second internal radiused transition between the internal crest and the internal stab flank. The internal root may have a shape that does not conform to the elliptical profile of the external thread form. When threadingly engaged the external load flank and the internal load flank form a first area of mating contact (which may form a seal) and the external stab flank and the internal stab flank form a second area of mating contact (which may also form a seal), and a dope volume is created between the external root and the internal root.

In certain embodiments, the external load flank is inclined with respect to a centerline of pin member by between approximately 1 and approximately 6 degrees, the external stab flank being inclined with respect to the centerline of the pin member and in a direction opposite the external load flank by between approximately 27 degrees and approximately 33 degrees. Moreover, in certain embodiments, the internal load flank is inclined with respect to a centerline of tubular box member by between approximately 1 and approximately 6 degrees, the internal stab flank being inclined with respect to the centerline of the pin member and in a direction opposite the internal load flank by between approximately 27 degrees and approximately 33 degrees.

In accordance with other aspects of the present disclosure, a threaded product comprises a tubular pin member comprising an external thread form at a pin end thereof, the external thread form comprising an external load flank, an external crest, an external stab flank, an external root, a first external radiused transition between the external load flank and the external crest, and a second external radiused transition between the external crest and the external stab flank, the external load flank being inclined with respect to a centerline of pin member, the external stab flank being inclined with respect to the centerline of the pin member and in a direction opposite the external load flank, and wherein the external root has an elliptical profile tangentially joining the external load and external stab flanks. When threadingly engaged with a mating tubular box member the external load flank forms a first area of mating contact with an internal load flank of the mating tubular box member, and the external stab flank forms a second area of mating contact with an internal stab flank of the mating tubular box member, and a dope volume is created between the external root and an internal root of the mating tubular box member.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure sets forth improvements in thread forms, particularly well suited for well environments and applications. In particular, high deviated drilling programs and short radius drilling programs are becoming widely used in existing wells to access some reservoirs for the first time. In deviated wells, changes in direction and orientation are implemented to access horizons and deposits of interest, and tubular products deployed in the wells must permit and withstand such deviations. Short radius programs enable drilling within the same zone, though tight curves. It should be borne in mind, however, that the thread forms and techniques outlined in the present disclosure may be applied to both land and offshore operations, and in different stages of well formation and drilling, working, completion, production.

Due to the steep angle of the deviated well, high bending stresses are induced in the pipe while rotating in the curved portion of the well. With these high bending moments the casing connection may develop fatigue cracks at the thread roots of the connection. It has been customary in conventional buttress threads that increasing the root radii at the corners of the thread form aids in the reduction of the connections' peak stresses at those critical areas. Most casing manufactures are now designing connections to help in the reduction on the connection fatigue stresses by applying this method. In developing these new connections by the above mentioned method, a loss of performance of the connection will be noticed. Designers may have to compromise with the reduction in torque and or tensile capacity of the connection due to the geometry of the connection, which is highly affected by the thread form design. In some cases it becomes obvious that there is not enough steel within the design area, resulting in the need for another method, such as undercutting the threads to produce a larger root radius. However, this method for the most part will yield two or more radii to produce this effect. In the same manner this method will also reduce the performance of the connection in torque and tensile capacity. Of particular concern, in many cases, may be the design of reliable tubular joints for applications involving severe dog legs, completion assemblies, and so forth.

Figure 1:
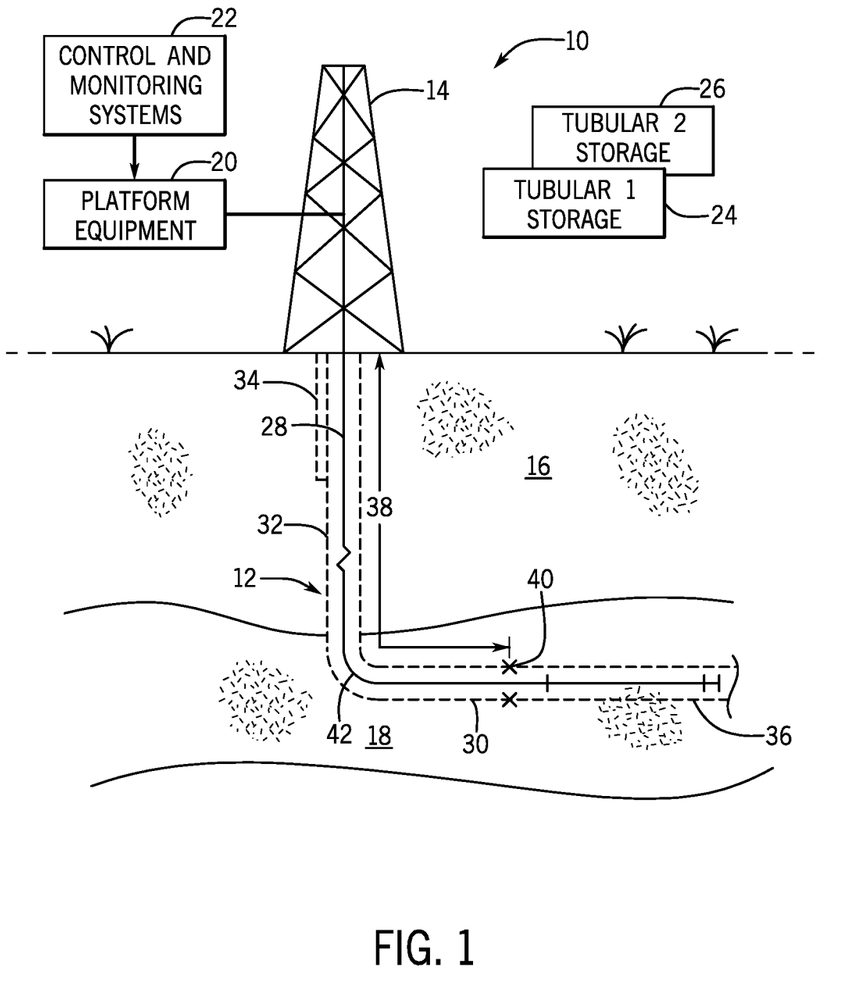
FIG. 1 is a diagrammatical representation of an example oil and gas application utilizing the new thread forms of the present disclosure.

FIG. 1 illustrates an exemplary well application utilizing the proposed thread form and tubulars incorporating it. As shown, the well system 10 comprises a well 12 formed in an area of interest on the ground surface. The system is illustrated as an onshore operation located on the earth's surface although the present thread forms and threaded products are not limited to such operations, but may be used in offshore applications, in which the drilling and service equipment and systems described would be located on a vessel or platform, and the well would be located below a body of water. In FIG. 1, the underlying ground or earth is illustrated below the surface such that well equipment is positioned near or over one or more wells 12. One or more subterranean horizons 16 are traversed by the well, which ultimately leads to one or more horizons of interest 18. The well and associated equipment permit, for example, accessing and extracting the hydrocarbons located in the hydrocarbon zones of interest, depending upon the purpose of the well. In many applications, the horizons will hold hydrocarbons that will ultimately be produced from the well, such as oil and/or gas. The well equipment may be used for any operation on the well, such as drilling, completion, workover, and so forth. In many operations the installation may be temporarily located at the well site, and additional components may be provided.

In the simplified illustration of FIG. 1, equipment is very generally shown, but it will be understood by those skilled in the art that this equipment is conventional and is found in some form in all such operations. For example, a derrick 14 allows for various tools, instruments and tubular strings to be assembled and lowered into the well, traversing both the horizons 16 and the particular horizons of interest 18. Well or surface equipment 20 will typically include draw works, a rotary table, generators, instrumentations, and so forth. Control and monitoring systems 22 allow for monitoring all aspects of drilling, completion, workover or any other operations performed, as well as well conditions, such as pressures, flow rates, depths, rates of penetration, and so forth.

In accordance with the present disclosure, various different tubular stocks may be provided that utilize the disclosed thread forms, and these may be stored on any suitable racks or other storage locations. In FIG. 1 a first of these is designated tubular 1 storage 24, and the second is designated tubular 2 storage 26. As will be appreciated by those skilled in the art, such tubular products may comprise lengths of pipe with connectors at each end to allow for extended strings to be assembled, typically by screwing one into the other, or two tubular products connected via a single coupling. Different tubular stocks may be used to allow the operation to balance the technical qualities and performance possibilities of each against their costs.

In the illustration of FIG. 1, a well comprises a first, generally vertical section 28 that extends through the upper horizons 16, and an off-vertical section 30 that extends through at least a portion of the zone of interest 18. The vertical section is formed to access the horizon of interest, and may extend to any desired depth, such as 7,000 feet to 12,000 feet. The off-vertical section may extend at any desired angle from the vertical section, which may be generally perpendicular to the vertical section, although other angles for this section may be used. In practice, a well or a well system may access a number of locations in one or more horizons of interest by directional drilling to create one or more such off-vertical sections. A casing 32 is illustrated as already deployed in the well. This casing may be at least partially surrounded by cement 34 after it is set, to fortify at least part of the well and to secure the casing in the zone of interest. As will be appreciated by those skilled in the art, the casing and cement sections may differ from well to well depending upon such factors as the geology of the subterranean horizons, the sizes desired, the anticipated conditions (e.g., pressures and flow) and so forth.

Near the end of the well, which will typically be in the off-vertical section 30, an open hole section 36 extends into the horizon of interest. In this illustrated embodiment, the casing 32 extends a length 38 through the vertical section 28 of the well and through a portion of the off-vertical section 30 to a limit 40. The casing comprises a tubular string that is run into the well following drilling. Such strings may comprise any suitable length of tubular products, and these will depend upon a number of factors, but typically the location of the horizon of interest (e.g., its depth and the length of the off-vertical section, the distance to a location of interest), the depth of the water, if offshore, and so forth. In the illustration of FIG. 1, the tubular casing extends into the open hole section 36. A heel 42 in the tubular string will be formed where the build section transitions with the horizontal section. As noted, the proposed thread form allows for improved performance in such wells, particularly where deviations require significant bending of tubular strings, and where tight bends are required for short radius programs.

The present disclosure relates to a thread form that incorporates a change in geometry evolving from the conventional buttress thread to achieve not only a high level of fatigue resistance to bending stresses, but also higher torque and tensile capabilities within the given design area. The resulting thread form may be particularly useful in short radius drilling applications by virtue of its greater fatigue resistance, torque, and tensile capacity, but also its light weight design. Mention al and ti The light weight design may be regarded meaning that a casing connection utilizing the new thread form has a small outer diameter and larger inner diameter on the connection, allowing for a reduction of pressure loss within the well, which may help to clean the hole of all cuttings and debris as the well is drilling, and that may allow for greater rate of penetration (i.e., reaching the target zone in less time). Along with the improved hydraulics within the drilling application the light weight design when used with tubulars offered by the new thread form may also include a change in steel alloy where the density of the alloy will aid in the total weight of the string.

The current design is aimed at evolving from a conventional buttress thread and moving on to what may be termed a more "ellipse" thread form that will allow for larger root surface as well as keeping the male and female members of the tubular connection engaged at their critical load-bearing contact areas while a bending moment is being applied to the casing connection. This design will also encompass high torsional and tensile capacity as well as reach a high level of fatigue cycles due to the geometry of the ellipse thread form, all while maintaining a large cross-sectional area on a light weigh alloy.

The new thread form is aimed at producing a strong, reliable, gas tight, light weight tubular connection which will encompass a new "ellipse" thread form to assist in reaching a high cyclic fatigue life of the connection. The thread form may be used in a single variable pitch shoulder casing connection, where the connection will have an internal mating shoulder This may aid in producing additional surface area for the higher torque requirements. The thread form may have one or two metal-to-metal interference seals adjacent to the internal and external shoulders. The invention will maintain minimal cross-sectional area at the critical design areas of the connection. The connection may have threads that will be on a taper, such as a step taper. Moreover, the connection may be machined on ferrous alloy and/or light weight non-ferrous alloys or in a combination of both.

The proposed thread form is, therefore, not a conventional buttress thread, but provides load flanks of the male and female thread members as well as a large root surface for distribution of bending stresses at the critical area of the connection by means of a single elliptical root on the external make thread form. In certain contemplated embodiments, the external or male thread form will have stab flank having an angle on the order of approximately 93° from the thread axis, and a load flank having an angle on the order of approximately 60° from the thread axis. The male thread form may have a single elliptical root between the load flank and stab flank. The thread roots and thread crest may not be in engagement. The internal or female thread form may have a stab flank having an angle on the order of approximately 60° from the thread axis, and a load flank having an angle on the order of approximately 93° from the thread axis. The internal thread form may not have an elliptical root. The root taper may be parallel to the crest taper. Moreover, the thread form may have supplementary radii at all corners to reduce any stress risers that could occur due to the bending loads. The internal and external threads may have a taper with a minimum change in revolution per thread on the order of approximately 0.003". The taper may allow for a maximum efficient use of the minimal cross-sectional area and deeper stabbing of the connection with minimal amount of revolutions to shoulder engagement.

Figure 2A:
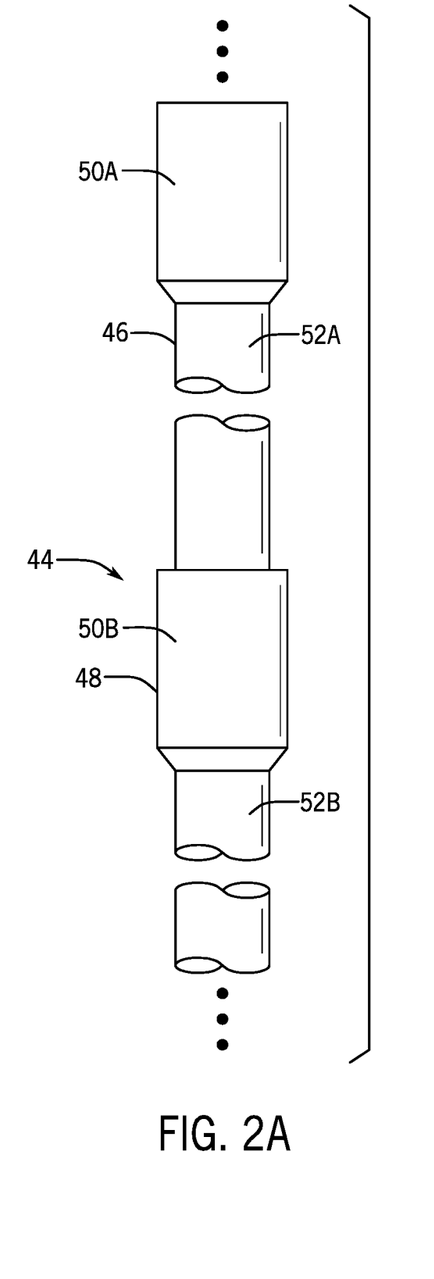
FIGS. 2A and 2B are a elevational views of portions of strings of tubular products that may utilize the new thread forms.
Figure 2B:
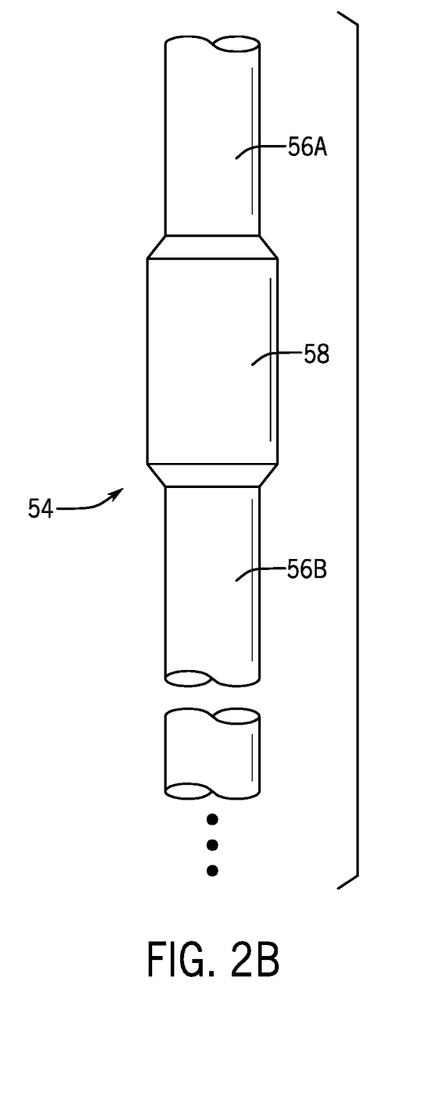

FIGS. 2A and 2B illustrate typical tubular strings that may be made up using the proposed thread forms. As noted, the thread forms may be used for a number of well applications, including drill pipe, casing, production tubulars, and so forth. In many cases, the tubular string, indicated by reference numeral 44 in FIG. 2A will comprise a number of standard sections, such as a first section 46 joined to a second section 48 by a threaded connection. In this embodiment, each tubular section has a box or female end 50A and 50B, and a tubular body 52A and 52B that each terminate in a male or pin end (not separately shown in FIG. 2A, but see FIGS. 3 and 6). Similarly, in certain other embodiments, a coupling arrangement may be provided for the connections, as illustrated in FIG. 2B. In these embodiments, the tubular string 54 comprises first and second sections 56A and 56B having male or pin ends that are threadingly received in a coupling 58. In both arrangements, internal threads on the box or coupling have a form described below, while external threads on the pin or male ends have a compatible form as also described below.

Figure 3:
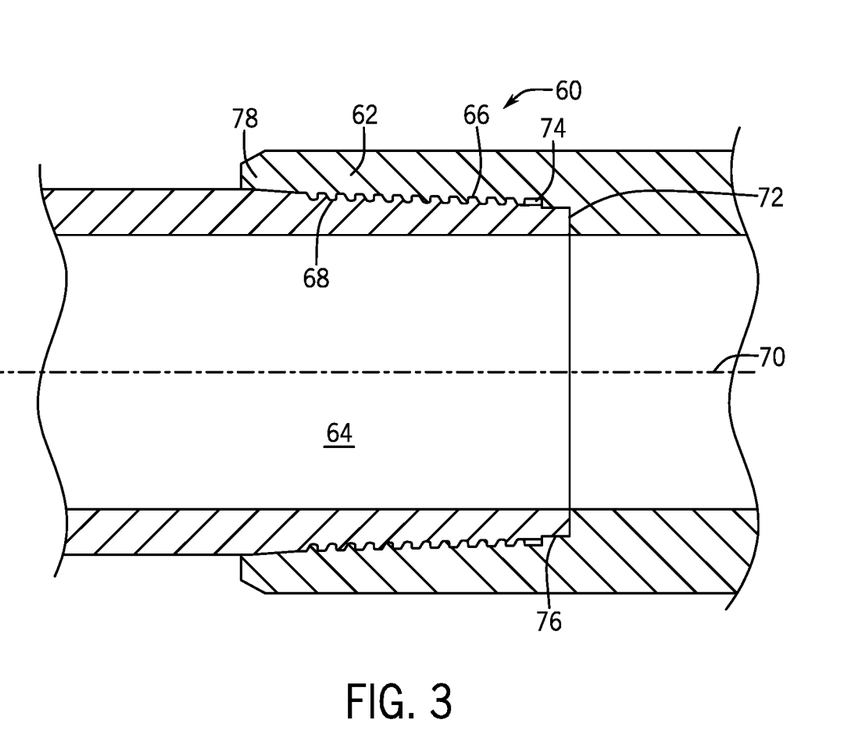
FIG. 3 is a sectional view through an example connection of joint made between two tubular members and utilizing the new thread forms.

FIG. 3 illustrates a joint or connection 60 comprising a tubular box member 62 and a tubular pin member 64 threadingly engaged. In a typical tubular string, the pin member will stab into the box member and will be threaded by rotation of one or both members until abutting surfaces stop the rotation and the thread forms are sealingly engaged, as discussed below. The box member 62 thus has an internal thread form 66 while the pin member 64 has a corresponding and mating external thread form 68. The tubular members are joined co-axially along a common centerline or axis 70 which is also the centerline or axis of the thread forms. In the illustrated embodiment, a torque shoulder 72 is provided on the interior surface of the box member to abut against an end of the pin member to stop engagement. Also, in this embodiment, the box and pin members have mating internal and external metal-to-metal compression seal surfaces that, when the tubular members are fully engaged, abut and form, adjacent to a void 74, a first seal 76. The box and pin members have additional sealing surfaces at a distal end of the box member that similarly abut and form a second metal-to-metal seal 78.

Figure 4:
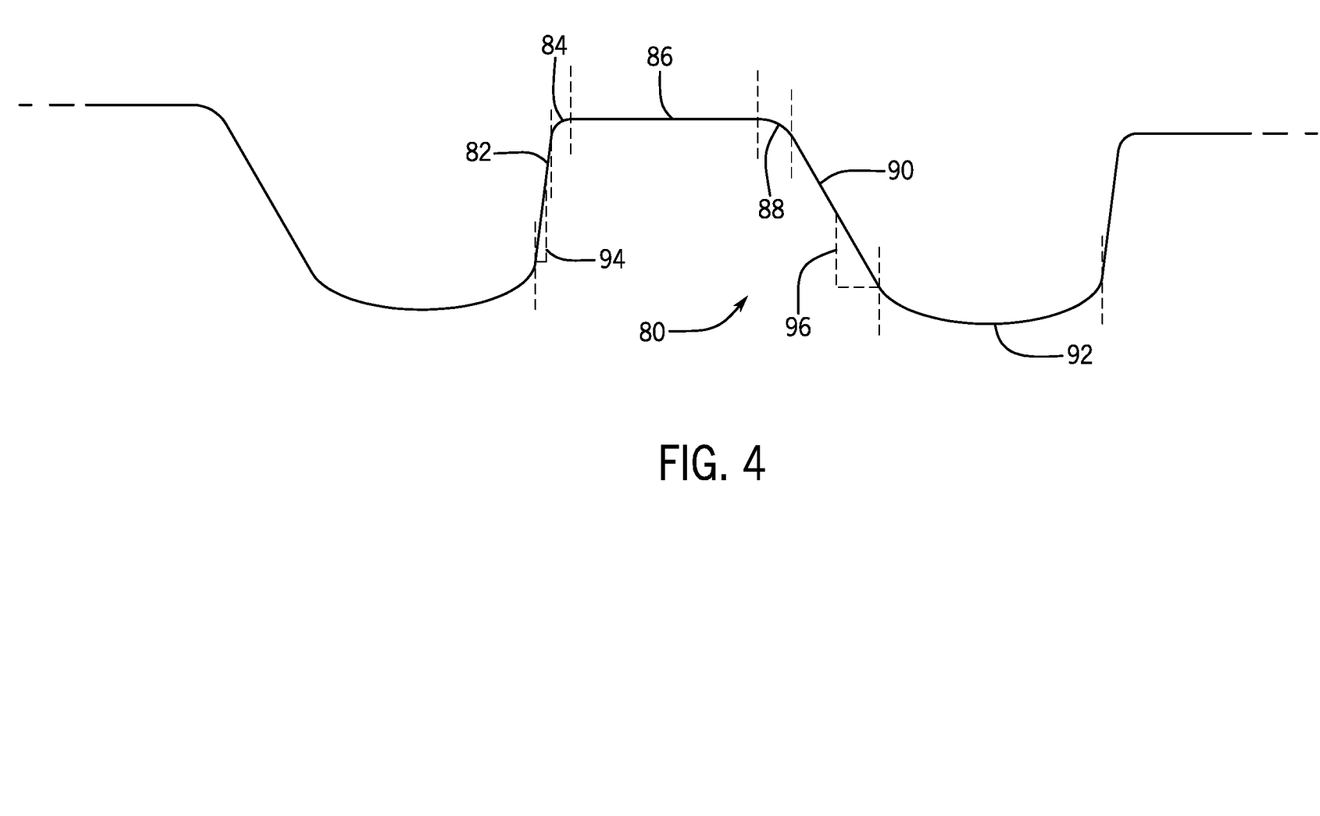
FIG. 4 is a thread profile illustrating features of a new external thread form.

FIG. 4 provides a more detailed view of the external thread form of the pin member. The thread form includes a number of features that aid in forming a sealed engagement that resists torsional, thrust, and bending loads, reduces stresses, and provides for a volume for dope between the external and internal threads when the pin and box members are fully engaged. As illustrated, from the tubular end towards the open, pin end, the thread form 80 has a load flank 82 followed by a radiused transition 84 to a crest 86. Forward of the crest 86 is another radiused transition 88, and a stab flank 90. The stab flank is inclined downwardly to a root 92 in the form of a partial ellipse. As noted below, the load and stab flanks are both inclined, though the load flank has a much steeper incline 94 than the incline 96 of the stab flank. It may also be noted that the elliptical root makes a smooth transition from the stab flank and to the load flank, such as by joining the ellipse of the root and the flanks at tangent points of the ellipse. The size, depth, inclines, and particular geometries of the elements of the external thread form may, of course, be adapted depending upon the type of tubular product to which it is applied, the size of the tubular product, the environment and anticipated loading, and so forth.

It should be noted that when used in connection with the illustrated transition zones between the flanks and the crest, the term "radiused" need not imply a circular radius. Other radius shapes and forms may be used, and these may include one or more curvatures. These curvatures aid in reducing stresses in the threads, and may be optimized based upon such factors as the size and form of the other thread form features, the loading, the materials used, and so forth.

In certain presently contemplated embodiments, the new thread form may be adapted for specific sizes and configurations, such as for OCTG product lines in sizes ranging from 2⅜" tubing to 20" casing. Moreover, the thread forms may be used, for example, on drilling tubulars ranging from 2⅜" OD drill pipe to 7⅝" OD drill pipe. As for the detailed design of the threads themselves, it is contemplated that an example embodiment may have 8 threads per inch in a single-lead configuration, and 4 threads per inch in a double-lead configuration. An example height or height range from root to crest may be on the order of approximately 0.034" to 0.140" for external threads, and 0.025" to 0.129" for internal threads. Example angles for the load flank may be from approximately 1° to approximately 6°, and more particular, approximately 3°. Example radii for transitions between the load flank and crest may be on the order of approximately 0.008" to approximately 0.015". In certain presently contemplated embodiments, the crest is parallel to the centerline of the tubular. The overall length of the crest may vary between, for example, approximately 0.042" to and approximately 0.052", depending upon the lead. The radius of the transition from the crest to the stab flank may vary, for example, between 0.008" to approximately 0.015". The angle of the stab flank may vary, for example, between approximately 27° to approximately 33°, and more particularly approximately 30°. The elliptical radius may be between approximately 12% to approximately 14%. Where a volume or area between the box and the thread provided (e.g., for dope), this may comprise a cross-sectional area of at least approximately 4.9583 in², based on the 2⅞" design. Such areas, as well as the particular overall configuration of the thread may, of course, change based upon the connection, the thread length, and the design size.

It should be noted that the present thread technologies may be employed with a range of materials, and particularly with those material used in well applications, such as steels, titanium, and aluminum. As discussed below, the threads may be optimized to maintain stresses and strains within desired ranges, based upon the forces anticipated during use (e.g., owing to the length of the tubular string, its size, axial, bending, and rotational forces, etc.). Moreover, various material combinations may be used, such that the box and pin members may be of the same material, or different materials. It is presently contemplated that the tread forms may be used with steel-steel tubular connections, steel-titanium connections, steel-aluminum connections, as well as with titanium-titanium connections, aluminum-aluminum connections, and titanium-aluminum connections.

Figure 5A:
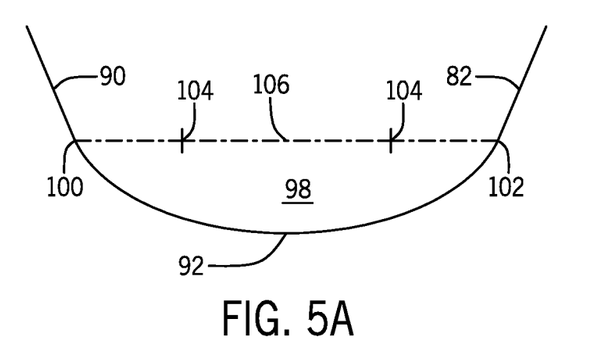
FIGS. 5A-5C are profile views of details of example embodiments for roots of the external thread form using an elliptical root form.
Figure 5B:
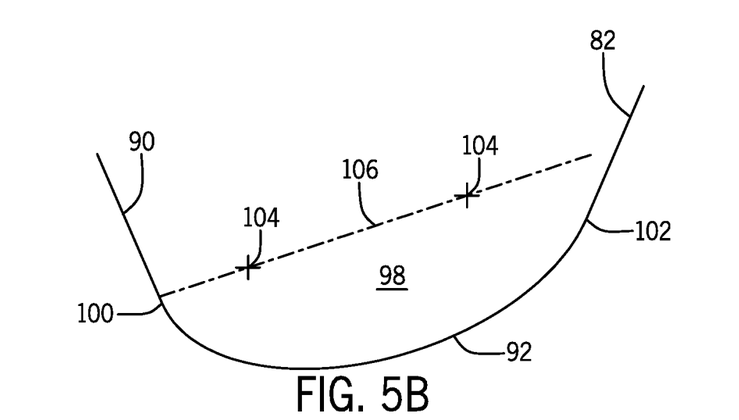
Figure 5C:
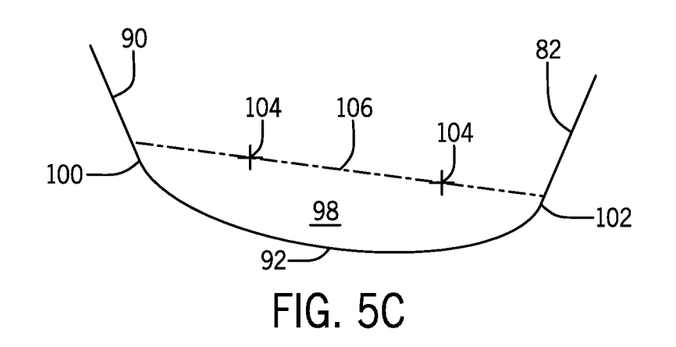

It may be further noted that in presently contemplated embodiments, the depth and geometry of the elliptical root may be selected based on a range of factors. These may include, for example, the length and pitch of the thread form, the stress relief desired of the elliptical root, and the dope volume to be provided between the elliptical root of the external thread form and the crest of the mating internal thread form, which is non-elliptical, as discussed below. Moreover, the major axis of the ellipse forming the root may be parallel to either the taper of the thread, which may comprise a step taper, or to the centerline or axis of the tubular pin member, or may be offset with respect to one or both of these. FIG. 5A illustrates an embodiment in which the elliptical root 92 joins the stab and load flanks tangentially, and where a volume 98 is formed by the ellipse. The transition points 100 and 102 are those points at which the flanks transition to the ellipse. Foci 104 of the ellipse lie on the major axis, which is generally parallel to either the taper of the thread form, or to the centerline or axis of the tubular member. FIG. 5B illustrates an alternative embodiment in which the major axis 106 of the ellipse of the root it inclined backwardly, while still joining the bordering flanks tangentially. In a further alternative illustrated in FIG. 5C, the major axis 106 of the root is inclined forwardly, again joining the bordering flanks tangentially. Regarding the taper, it may be noted that the pitch diameter of the thread may taper, and the crest may taper parallel to the pitch diameter or to the axis or rotation of the pin. Moreover, as noted, this taper may comprise a step taper.

Figure 6:
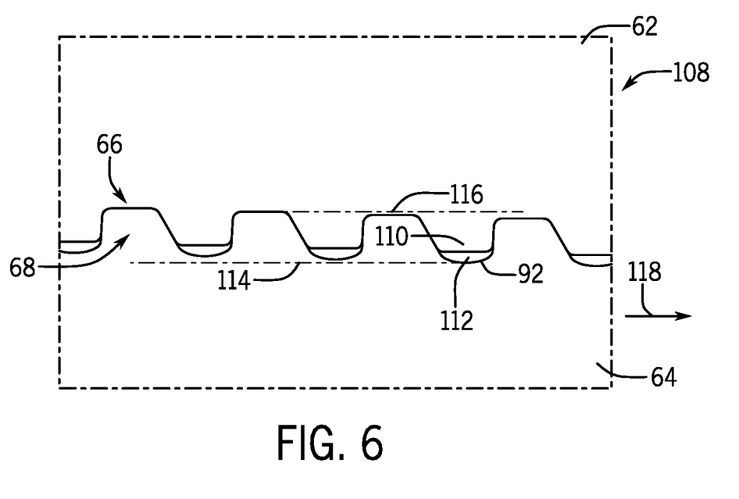
FIG. 6 is a detailed view of a portion of a connection or joint showing mating engagement of the external and internal thread forms.

FIG. 6 illustrates thread forms of the box member 62 and pin member 64 fully engaged. As shown, in the resulting joint 108, the load and stab flanks of the external and internal thread forms engage with one another to form areas of mating contact (which may form seals) on both sides of the thread. It should be noted that the crest of the internal thread form of the box member does not have a conforming elliptical shape, effectively creating, beneath internal thread form 110, a volume 112 for dope used to aid in sealing the joint. Moreover, the base of the external thread form root follows the taper, as indicated by line 114, while the crest of the external thread form also follows the taper as indicated by line 116, both in the direction of the open pin end as indicated by arrow 118.

Figure 7:
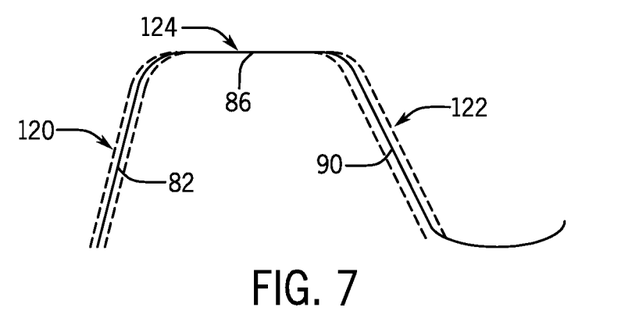
FIG. 7 is a diagrammatical representation of certain forces applied to the new thread form, illustrating balancing of the forces during use and permitted deformation.

FIG. 7 illustrates one thread of the new thread form when engaged in use, and subjected to stresses of a well application. As shown, forces on the thread may include compressive forces 120 on the load flank 82, compressive forces 122 on the stab flank 90, as well as compressive forces 124 on the crest. These forces come into play because all three of these surfaces of the external thread are in contact with corresponding surfaces of the internal thread when fully engaged. Some load balancing may take place between the flank loads, both due to the loads themselves and the angles of the flanks. Under the influence of such loading, during certain phases of use in well applications (e.g., when being rotated in deviated regions, short radii, well heels, etc.), deformation may be permitted and designed into the thread form as illustrated by the broken lines in FIG. 7, particularly owing to the presence of the elliptical root. Thus, the elliptical root not only provides a reservoir for dope (and exerts a hoop stress owing the presence of dope when the connection is made up), but reduces stresses and increases fatigue life in harsh and demanding well applications. In particular, in certain demanding and dynamic situations, the thread form may permit rocking movements where stresses are reduced by the elliptical root, among the other features of the thread form.

Figures 8, 9:
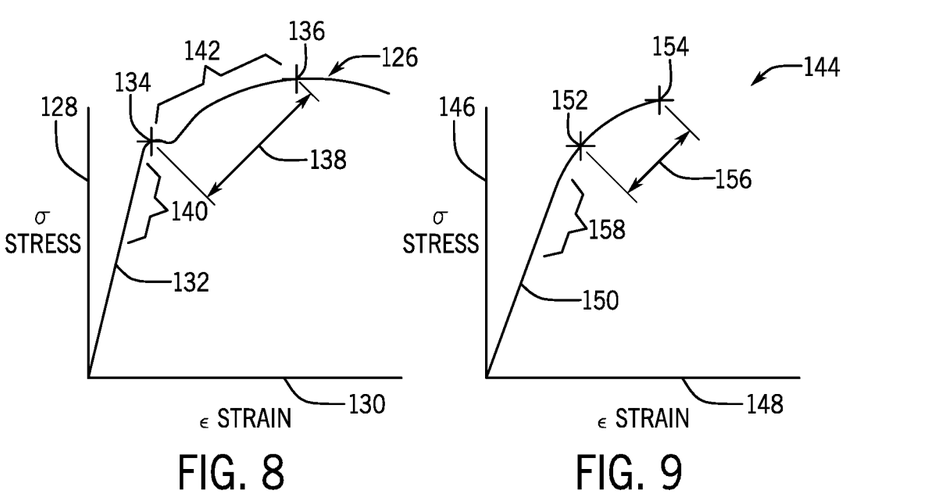
FIG. 8 is a stress-strain curve for steel illustrating certain ranges within which the thread form may operate during different phases of a well application.
FIG. 9 is a similar stress-strain curve for titanium or aluminum illustrating ranges in which the thread form may operate in well applications.

FIG. 8 illustrates an example stress-strain relationship 126 for steel, with stress along the vertical axis 128 and strain along the horizontal axis 130. Above the linear region 132, the yield strength is reached at point 134 followed by the ultimate tensile strength 136. For steel, the difference between the yield strength and the ultimate tensile strength may be on the order of 20-30 ksi. In certain presently contemplated embodiments, when steel is used (e.g. in a steel-steel connection), the thread form having the features outlined above may be designed to operate within a region 140 in well completion applications, while in a region 142 between the yield strength and the ultimate tensile strength in drilling operations. Such regions may usefully permit some degree of strain and localized yielding.

FIG. 9 is a similar example of a relationship 144 of stress 146 to strain 148, but for titanium or aluminum. Here, above the linear region 150, the yield strength 152 and ultimate tensile strength 154 may be separated on the order of 10 ksi for titanium, and 6 ksi for aluminum, as indicated by reference numeral 156. For such materials, it may be desired to adapt the thread form to remain within a region 158 during both drilling and completion operations.

It should be noted that references to "steel", "titanium" and "aluminum" should be understood to include various alloys of these materials. Those skilled in the art may readily obtain technical specifications of particular alloys, and may adapt the new thread forms for the materials, sizes, and loading given the disclosure provided here without undue experimentation. It should also be noted that as the disclosed thread may be adapted to certain materials and material properties, such as strengths can be changed, such as by heat treatment. Moreover, physical properties such as modulus may be taken into account as the thread forms are adapted, and it is contemplated that such adaptations based on factors such as modulus may be made to the pin or the box, or both.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A threaded product comprising:
a tubular pin member comprising an external thread form at a pin end thereof, the external thread form comprising an external load flank, an external crest, an external stab flank, an external root, a first external radiused transition between the external load flank and the external crest, and a second external radiused transition between the external crest and the external stab flank, the external load flank being inclined with respect to a centerline of pin member by between approximately 1 and approximately 6 degrees, the external stab flank being inclined with respect to the centerline of the pin member and in a direction opposite the external load flank by between approximately 27 degrees and approximately 33 degrees, and wherein the external root has an elliptical profile tangentially joining the external load and external stab flanks; and
a tubular box member configured to coaxially threadingly engage the tubular pin member and comprising an internal thread form at a box end thereof, the internal thread form comprising an internal load flank, an internal crest, an internal stab flank, an internal root, a first internal radiused transition between the internal load flank and the internal crest, and a second internal radiused transition between the internal crest and the internal stab flank, the internal load flank being inclined with respect to a centerline of tubular box member by between approximately 1 and approximately 6 degrees, the internal stab flank being inclined with respect to the centerline of the pin member and in a direction opposite the internal load flank by between approximately 27 degrees and approximately 33 degrees, and wherein the internal root has a shape that does not conform to the elliptical profile of the external thread form;
wherein when threadingly engaged the external load flank and the internal load flank form a first area of mating contact and the external stab flank and the internal stab flank form a second area of mating contact, and a dope volume is created between the external root and the internal root.

2. The threaded product of claim 1, wherein the external load flank and the internal load flank have substantially the same incline.

3. The threaded product of claim 1, wherein the external stab flank and the internal stab flank have substantially the same incline.

4. The threaded product of claim 1, wherein the external crest has a taper and the elliptical profile has a major axis substantially parallel to the taper.

5. The threaded product of claim 4, wherein the taper comprises a minimum of approximately 0.003" per revolution of thread.

6. The threaded product of claim 1, wherein the elliptical profile has a major axis that is not parallel to the external crest.

7. The threaded product of claim 1, wherein the tubular pin member comprises a first metal-to-metal compression seal surface near a forward end thereof, and/or the tubular box member comprises a second metal-to-metal compression seal surface that mates with the first metal-to-metal compression seal surface to form an internal seal.

8. The threaded product of claim 1, wherein the tubular box member comprises a torque shoulder that abuts a forward end of the tubular pin member.

9. The threaded product of claim 1, wherein the threaded product comprises a first extended tube with the tubular pin member and tubular box members at opposite ends thereof.

10. The threaded product of claim 1, wherein the threaded product comprises a first threaded tube with tubular pin members at ends thereof, and a tubular connector with tubular box members at opposite ends thereof.

11. A threaded product comprising:

a tubular pin member comprising an external thread form at a pin end thereof, the external thread form comprising an external load flank, an external crest, an external stab flank, an external root, a first external radiused transition between the external load flank and the external crest, and a second external radiused transition between the external crest and the external stab flank, the external load flank being inclined with respect to a centerline of pin member, the external stab flank being inclined with respect to the centerline of the pin member and in a direction opposite the external load flank, and wherein the external root has an elliptical profile tangentially joining the external load and external stab flanks, wherein the external load flank being inclined with respect to the centerline of pin member by between approximately 1 and approximately 6 degrees; and a tubular box member configured to coaxially threadingly engage the tubular pin member and comprising an internal thread form at a box end thereof, the internal thread form comprising an internal load flank, an internal crest, an internal stab flank, an internal root, a first internal radiused transition between the internal load flank and the internal crest, and a second internal radiused transition between the internal crest and the internal stab flank, the internal load flank being inclined with respect to a centerline of tubular box member, the internal stab flank being inclined with respect to the centerline of the pin member and in a direction opposite the internal load flank, and wherein the internal root has a shape that does not conform to the elliptical profile of the external thread form, wherein the internal load flank being inclined with respect to a centerline of tubular box member by between approximately 1 and approximately 6 degrees;

wherein when threadingly engaged the external load flank and the internal load flank form a first area of mating contact and the external stab flank and the internal stab flank form a second area of mating contact, and a dope volume is created between the external root and the internal root.

12. The threaded product of claim 11, wherein the external load flank and the internal load flank have substantially the same incline.

13. The threaded product of claim 11, wherein the external stab flank and the internal stab flank have substantially the same incline.

14. The threaded product of claim 11, wherein the external crest has a step taper and the elliptical profile has a major axis substantially parallel to the step taper.

15. The threaded product of claim 11, wherein the tubular pin member comprises a first metal-to-metal compression seal surface near a forward end thereof, and/or the tubular box member comprises a second metal-to-metal compression seal surface that mates with the first metal-to-metal compression seal surface to form an internal seal.

16. A threaded product comprising:

a tubular pin member comprising an external thread form at a pin end thereof, the external thread form comprising an external load flank, an external crest, an external stab flank, an external root, a first external radiused transition between the external load flank and the external crest, and a second external radiused transition between the external crest and the external stab flank, the external load flank being inclined with respect to a centerline of pin member, the external stab flank being inclined with respect to the centerline of the pin member and in a direction opposite the external load flank, and wherein the external root has an elliptical profile tangentially joining the external load and external stab flank, wherein the external load flank being inclined with respect to the centerline of pin member by between approximately 1 and approximately 6 degrees;

wherein when threadingly engaged with a mating tubular box member the external load flank forms a first area of mating contact with an internal load flank of the mating tubular box member, and the external stab flank forms a second area of mating contact with an internal stab flank of the mating tubular box member, and a dope volume is created between the external root and an internal root of the mating tubular box member.

17. The threaded product of claim 16, wherein the external crest has a step taper and the elliptical profile has a major axis substantially parallel to the step taper.

18. The threaded product of claim 17, wherein the step taper comprises a minimum of approximately 0.003" per revolution of thread.

19. The threaded product of claim 16, wherein the elliptical profile has a major axis that is not parallel to the external crest.

20. The threaded product of claim 16, wherein the threaded product comprises a first extended tube with the tubular pin member at one end thereof and a tubular box member at an opposite end.

* * * * *